United States Patent
Feldmann et al.

(10) Patent No.: US 9,121,323 B2
(45) Date of Patent: Sep. 1, 2015

(54) NITROGEN OXIDE SENSOR STUCK-IN-RANGE DIAGNOSTIC TOOL

(75) Inventors: Scott T. Feldmann, South Lyon, MI (US); Justin A. Shetney, Livonia, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1174 days.

(21) Appl. No.: 13/087,429

(22) Filed: Apr. 15, 2011

(65) Prior Publication Data

US 2012/0260625 A1 Oct. 18, 2012

(51) Int. Cl.
*F01N 3/00* (2006.01)
*F01N 3/20* (2006.01)
*F01N 11/00* (2006.01)
*F01N 3/10* (2006.01)
*F01N 3/021* (2006.01)

(52) U.S. Cl.
CPC .............. *F01N 3/2066* (2013.01); *F01N 11/00* (2013.01); *F01N 3/021* (2013.01); *F01N 3/103* (2013.01); *F01N 2560/026* (2013.01); *F01N 2610/148* (2013.01); *Y02T 10/24* (2013.01); *Y02T 10/47* (2013.01)

(58) Field of Classification Search
CPC ....... F01N 3/2066; F01N 3/103; F01N 3/021; F01N 2560/026; F01N 2610/148; F01N 11/00; Y02T 10/47; Y02T 10/24
USPC ........... 60/277, 285, 295, 297, 301, 311, 274, 60/276
See application file for complete search history.

(56) References Cited

U.S. PATENT DOCUMENTS

| | | | |
|---|---|---|---|
| 6,453,663 B1 * | 9/2002 | Orzel et al. | 60/277 |
| 7,921,706 B2 * | 4/2011 | Sumitani | 73/114.69 |
| 7,980,060 B2 * | 7/2011 | Tachimoto et al. | 60/277 |
| 8,219,278 B2 * | 7/2012 | Sawada et al. | 701/30.3 |
| 8,359,826 B2 * | 1/2013 | Kitazawa | 60/277 |
| 8,474,242 B2 * | 7/2013 | Andrews et al. | 60/277 |
| 2005/0103000 A1 | 5/2005 | Nieuwstadt et al. | |
| 2008/0262704 A1 | 10/2008 | Kawase et al. | |
| 2009/0013665 A1 | 1/2009 | Brahma | |
| 2010/0218487 A1 | 9/2010 | Wang et al. | |
| 2011/0000290 A1 | 1/2011 | Sawada et al. | |

FOREIGN PATENT DOCUMENTS

| | | |
|---|---|---|
| DE | 19945374 A1 | 3/2001 |
| DE | 10103415 A1 | 10/2002 |
| DE | 10309422 A1 | 9/2004 |

* cited by examiner

*Primary Examiner* — Thomas Denion
*Assistant Examiner* — Diem Tran
(74) *Attorney, Agent, or Firm* — Quinn Law Group, PLLC

(57) ABSTRACT

A vehicle includes an engine, an exhaust system, an SCR device, upstream and downstream NOx sensors, and a controller. The controller is in electrical communication with the NOx sensors, and is configured for detecting a stuck-in-range fault condition of the downstream NOx sensor during a low exhaust flow condition. The controller detects the condition, receives the upstream and downstream NOx levels from the respective upstream and downstream NOx sensors, and compares these levels to a zero or near-zero threshold when the low exhaust flow condition is active. The controller is also configured for executing a first control action when the upstream NOx level is below the threshold and the downstream NOx level exceeds the threshold, and executing a second control action when neither of the levels exceeds the threshold. A method is also disclosed for diagnosing the stuck-in-range condition.

13 Claims, 2 Drawing Sheets

NITROGEN OXIDE SENSOR STUCK-IN-RANGE DIAGNOSTIC TOOL

TECHNICAL FIELD

The present disclosure relates to a system and a method for determining the performance of a nitrogen oxide sensor of the type used in an engine exhaust system.

BACKGROUND

Internal combustion engines generate nitrogen oxide (NOx) gasses as natural byproducts of the fuel combustion process. NOx gasses may be present in an engine exhaust stream in various forms, including as nitric oxide (NO), nitrogen dioxide ($NO_2$), and/or nitrous oxide ($N_2O$). To reduce the levels of the various NOx gasses present in vehicle tailpipe emissions, modern vehicles may be equipped with certain catalytic devices which collectively reduce these gasses to inert compounds.

Within a typical vehicle exhaust system, a suitable reductant such as ammonia or urea may be added at precisely controlled rates to the NOx-containing exhaust stream and then passed through a selective catalytic reduction (SCR) device. Catalytic action of the SCR device converts the NOx gasses into nitrogen and water. Sensors are positioned in the exhaust stream to measure NOx levels at various points of the exhaust system. Sensor measurements may be used to calculate the conversion efficiency of the SCR device and other values. The SCR device is typically replaced when the conversion efficiency drops below a threshold level.

SUMMARY

A vehicle is disclosed herein which includes a controller configured for diagnosing a stuck-in-range fault condition of a NOx sensor. As used herein, the stuck-in-range fault condition refers to a frozen or locked NOx sensor reading occurring during a period of low exhaust flow. The same sensor may exhibit otherwise normal behavior during periods of higher exhaust flow. This inconsistent behavior can frustrate an accurate diagnosis of the problem. Indeed, in practice such a fault condition is often misdiagnosed as corresponding to a failing or failed SCR device, which in turn may lead to potentially expensive and unnecessary repair or replacement of the SCR device. The present approach as disclosed herein helps resolve this particular maintenance problem.

In particular, the present vehicle includes an internal combustion engine, an exhaust system having an SCR device as well as upstream and downstream NOx sensors, and a controller. The terms "upstream" and "downstream" as used herein refer to sensor position in the exhaust system relative to the SCR device, i.e., on the inlet and outlet sides of the SCR device, respectively. The controller is in electrical communication with the sensors, and is configured for detecting a stuck-in-range fault condition of the downstream NOx sensor during a predetermined low exhaust flow condition.

The controller detects the predetermined low exhaust flow condition, receives upstream and downstream NOx levels from the respective upstream and downstream sensors, and compares each of the upstream and downstream NOx levels to a threshold when the low exhaust flow condition is active. The controller also executes a first control action when the upstream NOx level is below the threshold and the downstream NOx level exceeds the threshold, and executes a second control action when neither of the upstream or downstream NOx levels exceeds the threshold.

A method is also disclosed which includes receiving, by the controller, a signal describing upstream NOx levels from the upstream NOx sensor, and receiving downstream NOx levels from the downstream NOx sensor. The method includes comparing each of the upstream and downstream NOx levels to a zero or a low near-zero threshold when the low exhaust flow condition is active. The method further includes executing a first control action when the upstream NOx level is below the threshold and the downstream NOx level exceeds the threshold, and executing a second control action when neither of the upstream or downstream NOx levels exceeds the threshold.

The above features and advantages and other features and advantages of the present invention are readily apparent from the following detailed description of the best modes for carrying out the invention when taken in connection with the accompanying drawings.

DESCRIPTION

Figure 1:
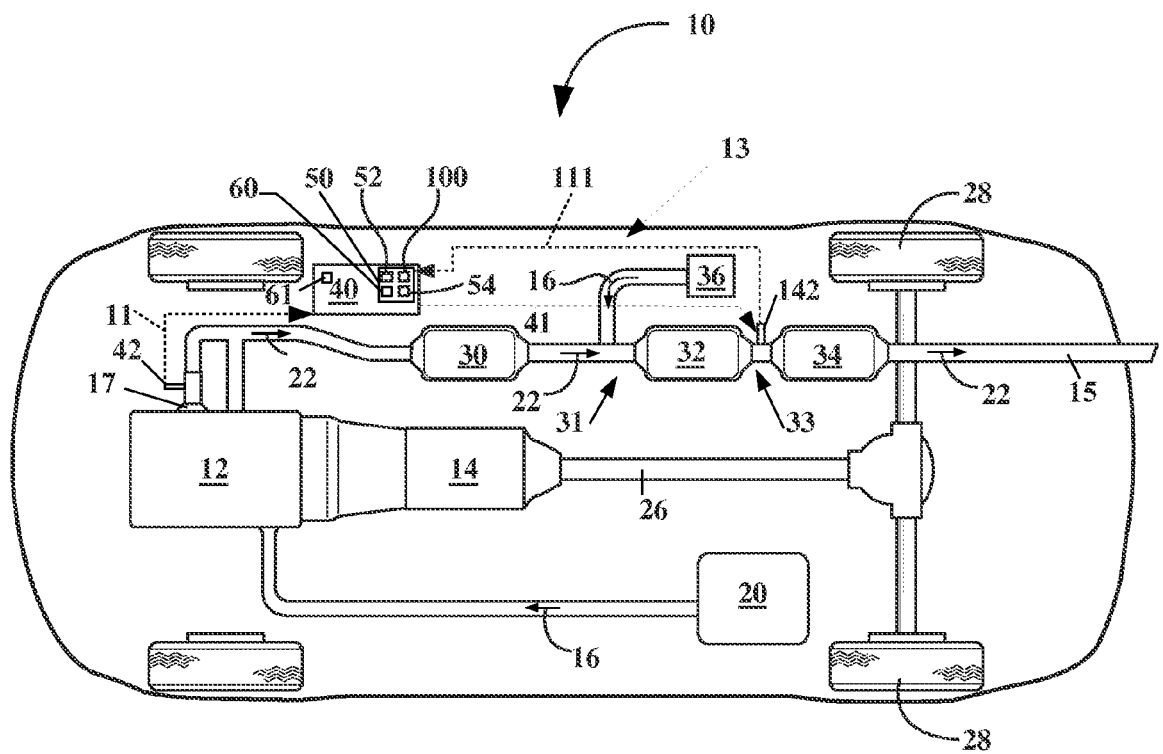
FIG. 1 is a schematic illustration of a vehicle having an exhaust system which includes a selective catalytic reduction (SCR) device, a pair of nitrogen oxide (NOx) sensors, and a controller configured for diagnosing a stuck-in-range fault condition of one of the NOx sensors.
Figure 2:
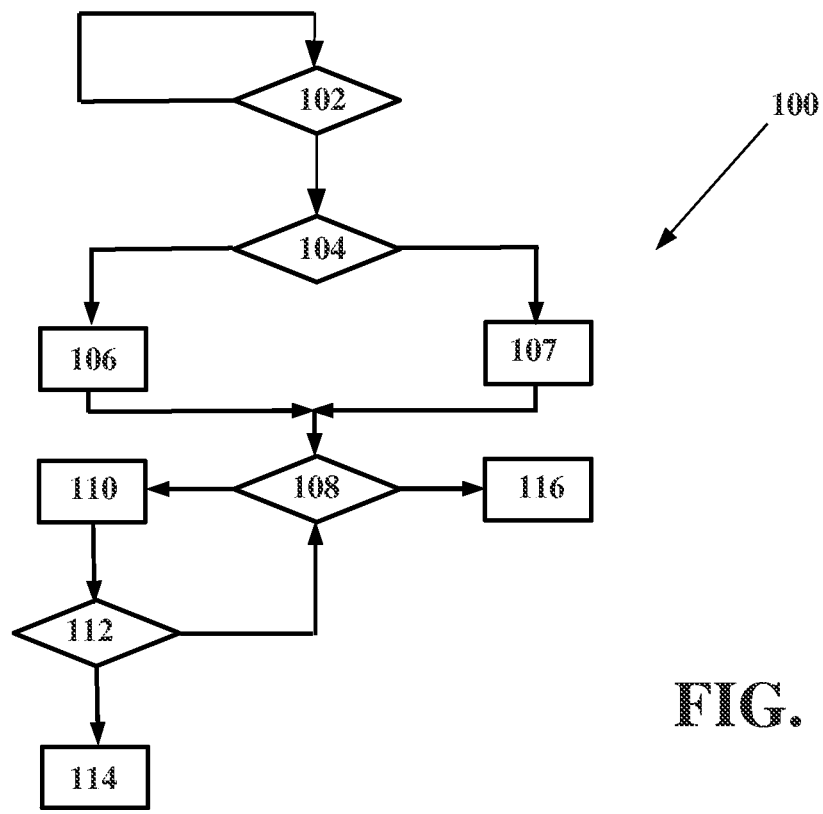
FIG. 2 is a flow chart describing a method for automatically diagnosing the stuck-in-range condition aboard the vehicle shown in FIG. 1.

Referring to the drawings, wherein like reference numbers correspond to like or similar components throughout the several figures, a vehicle 10 having an exhaust system 13 is shown schematically in FIG. 1. The vehicle 10 includes a controller 40 configured for diagnosing a stuck-in-range fault condition of a particular NOx sensor, e.g., a downstream NOx sensor 142. The controller 40 includes tangible/non-transitory memory 50 and process instructions encoding the present method 100, an example of which is shown in FIG. 2 and described below. Execution of the method 100 by associated hardware components of the controller 40 ultimately detects this particular fault condition, with a suitable control action or actions taken by the controller 40.

The vehicle 10 includes an internal combustion engine 12, e.g., a diesel or gasoline engine of the type known in the art. The engine 12 compresses fuel 16 delivered from a fuel tank 20. The engine 12 ultimately generates an exhaust stream (arrows 22) as a byproduct of the fuel combustion process. The exhaust stream (arrows 22) contains nitrogen oxide (NOx) gasses as it is discharged from the various cylinders of the engine 12. As the exhaust stream (arrows 22) passes through the exhaust system 13 of the vehicle 10, components of the exhaust system 13 reduce the levels of such NOx gasses before the exhaust stream (arrows 22) is discharged to the surrounding atmosphere through a tailpipe 15.

The exhaust system 13 includes a selective reduction catalyst (SCR) device 32 as well as respective upstream and downstream NOx sensors 42 and 142. The SCR device 32 has an inlet side 31 and an outlet side 33. The SCR device 32 may be configured as a ceramic brick or honeycomb structure, a plate, or any other suitable catalytic design configured for catalytically converting $NO_x$ gasses in the exhaust stream (arrows 22) into diatomic nitrogen and water. The upstream NOx sensor 42 is positioned on the inlet side of the SCR device 32, such as at or near outlet port(s) 17 of the engine 12. Likewise, the downstream NOx sensor 142 is positioned on the outlet side of the SCR device 32, such as just upstream of a heat-regenerable particulate filter 34. Measured NOx levels (arrows 11, 111) from the respective NOx sensors 42 and 142 are electrically communicated to the controller 40 for use in executing the method 100.

Depending on the embodiment, the exhaust system 13 may further include an oxidation catalyst 30 upstream of the SCR device 32, i.e., on the inlet side 31 of the SCR device 32. The particulate filter 34 is heat regenerable, i.e., can be selectively regenerated using heat, e.g., by injecting some fuel 16 into the exhaust stream (arrows 22) into or downstream of the oxidation catalyst 30 via a fuel injector assembly 36. The particulate filter 34 may be constructed of ceramic foam, metal mesh, pelletized alumina, or any other temperature and application-suitable material(s). While not shown for clarity, the fuel injector assembly 36 is in fluid communication with the fuel tank 20, for instance using a fuel line, fittings, and any other required fluid control components.

Still referring to FIG. 1, energy released by the combustion of fuel 16 produces torque on a rotatable input member (not shown) of a transmission 14. Torque from the engine 12 is transferred through the various gear sets, clutches, brakes, and interconnecting members (not shown) of the transmission 14 to a rotatable transmission output member 26. Output torque from the transmission 14 is thus delivered via the output member 26 to a set of drive wheels 28. While an example rear-wheel drive configuration is shown in FIG. 1, the vehicle 10 may be configured with front-wheel drive or four/all-wheel drive capability.

With respect to the controller 40, this device may be configured as a host machine, e.g., a digital computer or microcomputer, having the memory 50, a microprocessor or central processing unit (CPU), random access memory (RAM), electrically erasable programmable read only memory (EEPROM), a high-speed clock, analog-to-digital (A/D) and/or digital-to-analog (D/A) circuitry, a timer 60, and any required input/output circuitry and associated devices, as well as any required signal conditioning and/or signal buffering circuitry. The controller 40 receives and records the measured NOx levels (arrows 11, 111), and in some embodiments may selectively generate and transmit a debouncing signal (arrow 41) to the downstream NOx sensor 142 as explained below.

Memory 50 may include several designated memory locations, including respective first and second memory locations 52 and 54 as explained below with reference to FIG. 2. The method 100 and any required reference calibration values can be recorded in memory 50 and accessed by any required hardware and software components of the controller 40 to provide the present diagnostic capability.

Referring to FIG. 2 in conjunction with the structure of the vehicle 10 shown in FIG. 1 and described above, one embodiment of the present method 100 begins with step 102, wherein the controller 40 determines whether a fuel shutoff event has occurred. Step 102 may entail detecting a key position, checking a run status of the engine 12, using an exhaust flow sensor (not shown), or using any other suitable method or device. The controller 40 proceeds to step 104 only when the fuel shutoff event is determined.

At step 104, the controller 40 next determines whether regeneration of the particulate filter 34 is active. The controller 40 proceeds to step 106 when an active regeneration event is present. Otherwise, the controller 40 proceeds to step 107.

At step 106, the measured NOx levels (arrows 11, 111) from the respective upstream and downstream NOx sensors 42, 142 are communicated to the controller 40 and recorded in memory 50 in the first memory location 52 corresponding to the combined fuel shutoff and regeneration conditions of steps 102 and 104, respectively. Step 106 may entail starting the timer 60 and measuring a total amount of NOx over a calibrated interval, with this total amount passed as the measured NOx levels (arrows 11, 111). The controller 40 proceeds to step 108 when NOx levels (arrows 11, 111) are received and properly recorded in memory 50.

At step 107, the measured NOx levels (arrows 11, 111) from the respective upstream and downstream NOx sensors 42, 142 are communicated to the controller 40 and recorded in the second memory location 54. As with step 106, step 107 may entail starting the timer 60 and measuring a total amount of NOx over a calibrated interval, with this total amount passed as the measured NOx levels (arrows 11, 111). The second memory location 54 is identified as corresponding to the fuel shutoff/normal operating condition. The controller 40 proceeds to step 116.

At step 108, the controller 40 compares the measured NOx levels (arrows 11, 111) from the respective upstream and downstream NOx sensors 42, 142 for each of the conditions of steps 106 and 107 to a minimal threshold, i.e., zero or within a minimal calibrated range of zero. If the downstream NOx sensor 142 is not currently reporting a zero or near zero value for either the combined fuel shutoff and regeneration condition of step 106 or the combined fuel shutoff and normal operation condition of step 107, the controller 40 proceeds to step 110. Otherwise, the controller 40 proceeds to step 112.

At step 110, the controller 40 may optionally attempt to debounce the signal from the downstream NOx sensor 142 in an attempt at clearing the error state. As used herein, the terms "debounce" and "debouncing" refer to running a timer or counter with a count value accumulating up to a fail condition. For instance, if a fail condition is indicated by the previous steps, step 110 may include starting an additional debouncing timer or counter 61 which counts through a calibrated interval (timer), e.g., failing for 10 continuous seconds or 10 reporting events.

In a possible "counter" embodiment, an up/down ramp is provided in which the timer/counter 61 increments an error count with each failing result and decrements with each passing result instead of resetting to zero as in the prior example. This example may be particularly beneficial with noisy signals or tests where "good" results may be registered among a string of "bad" results, thus preventing the one good result from skewing the test result or indicating a false passing condition. The calibrated period for the debouncing timer/counter 61 should be long enough to allow any transient failures to clear, thus preventing false fail situations. The controller 40 proceeds to step 112 upon executing a suitable debouncing sequence.

At step 112, the controller determines if step 110 was successful, for instance by comparing the measured NOx levels (arrows 11, 111) to a zero or near-zero reference. If successful at step 110, the controller 40 repeats step 108. If debouncing efforts are unsuccessful, the controller 40 proceeds instead to step 114.

At step 114, the controller 40 executes a first control action indicating a stuck-in-range fault condition for the downstream NOx sensor 142. Step 114 may include recording a diagnostic code in memory 50, transmitting the code to a remote location via a telematics unit (not shown), displaying a message and/or icon to the driver of vehicle 10, etc. The recorded diagnostic code should signal repair or replacement of the downstream NOx sensor 142, typically a substantially less expensive and more appropriate corrective action than replacing the SCR device 32, as noted above. The method 100 is complete after the controller 40 finishes executing step 114.

At step 116, the controller 40 determines that the measurements from the NOx sensors 42, 142 are valid, and executes a second control action. The second control action may entail, by way of example, recording a diagnostic code in memory 50 indicating that the downstream NOx sensor 142 is properly functioning. In another embodiment, as shown in FIG. 3, step 116 may include executing steps 118-126 to further diagnose the proper performance of the NOx sensor 142.

Figure 3:
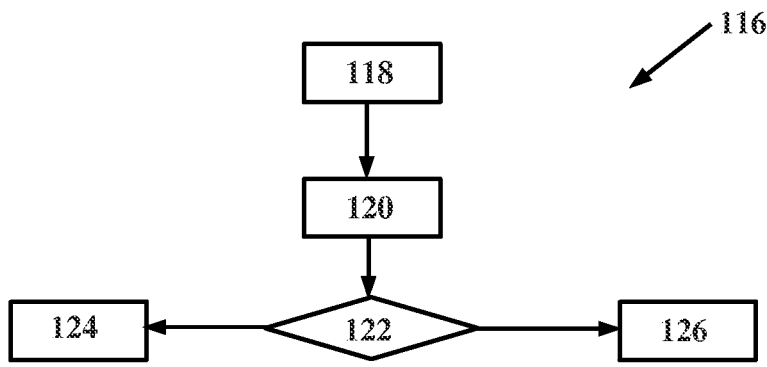
FIG. 3 is a flow chart describing a possible embodiment of one step of the method shown in FIG. 2.

Referring to FIG. 3, in one embodiment step 116 of FIG. 2 may include executing a series of steps 118-126. Step 118 may include recording in memory 50 the current NOx value from the downstream NOx sensor 142 as an initial NOx parameter. Once recorded, the controller 40 proceeds to step 120.

At step 120, the controller 40 may start the timer 60, and then allow a calibrated interval to elapse. At the end of the interval, the controller 40 proceeds to step 122.

At step 122, the controller 40 determines whether a predetermined set of conditions has been satisfied. For instance, the controller 40 may determine whether the current NOx value has risen a calibrated amount over the initial value, and also whether the level of downstream NOx, as reported by the downstream NOx sensor 142, has risen a calibrated amount over the level of upstream NOx as reported by the upstream NOx sensor 42. If the predetermined set of conditions has been satisfied, the controller 40 proceeds to step 124. Otherwise the controller 40 proceeds to step 126.

At step 124, the controller 40 may execute a third control action such as recording a diagnostic code indicating that the reported NOx levels from the downstream NOx sensor 142 are presently rising, which may indicate an impending sensor failure. A message or icon may be displayed to a driver of the vehicle 10 alerting the driver to this impending failure. The method 100 is finished once this code is recorded.

At step 126, the controller 40 may record a diagnostic code indicating that the downstream NOx sensor 142 is indeed functioning properly, or may take another suitable control action.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine which generates an exhaust stream;
an exhaust system having:
a selective catalytic reduction (SCR) device configured to catalytically convert nitrogen oxide (NOx) gasses present in the exhaust stream into water and nitrogen;
an upstream NOx sensor configured to measure an upstream NOx level on an inlet side of the SCR device; and
a downstream NOx sensor configured to measure a downstream NOx level on an outlet side of the SCR device; and
a controller in electrical communication with the upstream and downstream NOx sensors, wherein the controller includes memory;
wherein the controller is configured for detecting a stuck-in-range fault condition of the downstream NOx sensor by:
detecting a predetermined low exhaust flow condition;
receiving the upstream and downstream NOx levels from the respective upstream and downstream NOx sensors;
comparing each of the upstream and downstream NOx levels to a threshold when the predetermined low exhaust flow condition is active;
executing a first control action when the upstream NOx level is below the threshold and the downstream NOx level exceeds the threshold, including indicating a stuck-in-range fault condition for the downstream NOx sensor; and
executing a second control action when neither of the upstream or downstream NOx levels exceeds the threshold, including recording a diagnostic code in the memory of the controller indicating that the downstream NOx sensor is properly functioning.

2. The vehicle of claim 1, wherein the controller is configured for determining when the predetermined low exhaust flow condition is present by detecting a fuel shutoff event.

3. The vehicle of claim 1, further comprising a particulate filter positioned on the outlet side of the SCR device, wherein the controller is further configured for detecting a regenerative event of the particulate filter.

4. The vehicle of claim 1, wherein the controller is configured for:
recording the current NOx value from the downstream NOx sensor as an initial NOx parameter when the upstream and downstream NOx levels do not exceed the threshold;
determining whether the current NOx value has risen a calibrated amount over the initial value over a calibrated interval;
determining whether a level of downstream NOx has risen a calibrated amount over the level of upstream NOx over the same interval; and
executing a third control action when the current NOx value has risen a calibrated amount over the initial value and the level of downstream NOx has risen a calibrated amount over the level of upstream NOx.

5. A method for diagnosing a stuck-in-range fault condition of a downstream NOx sensor in a vehicle during a predetermined low exhaust flow condition, wherein the vehicle includes an exhaust system having a controller with memory, a selective reduction catalyst (SCR) device, the downstream NOx sensor which is configured to measure a downstream NOx level on an outlet side of the SCR device, and an upstream NOx sensor which is configured to measure an upstream NOx level on an inlet side of the SCR device, the method comprising:
detecting, via the controller, the low exhaust flow condition;
measuring the upstream and the downstream NOx levels using the respective upstream and downstream NOx sensors;
receiving, by the controller, the upstream NOx level from the upstream NOx sensor;
receiving, by the controller, the downstream NOx level from the downstream NOx sensor;
comparing each of the upstream and downstream NOx levels to a zero or a near-zero threshold when the predetermined low exhaust flow condition is active;
executing, via the controller, a first control action when the upstream NOx level is below the threshold and the downstream NOx level exceeds the threshold, including indicating a stuck-in-range fault condition for the downstream NOx sensor; and executing, via the controller, a second control action when neither of the upstream or downstream NOx levels exceeds the threshold, including recording a diagnostic code in memory of the controller indicating that the downstream NOx sensor is properly functioning.

6. The method of claim 5, wherein detecting the low exhaust flow condition includes determining when a fuel shutoff event is active.

7. The method of claim 6, wherein determining when a fuel shutoff event is active includes detecting at least one of a key position and an engine state.

8. The method of claim 5, wherein the exhaust system includes a heat-regenerable particulate filter positioned on an outlet side of the SCR device, the method further comprising:
 detecting an active regenerative event of the particulate filter.

9. The method of claim 5, further comprising:
 starting a debouncing timer or counter via the controller when the downstream NOx level exceeds the threshold.

10. The method of claim 5, further comprising:
 recording the current NOx value from the downstream NOx sensor as an initial NOx parameter when the upstream and downstream NOx levels do not exceed the threshold;
 determining whether the current NOx value has risen a calibrated amount over the initial value over a calibrated interval;
 determining whether a level of downstream NOx has risen a calibrated amount over the level of upstream NOx over the same interval; and
 executing a third control action when the current NOx value has risen a calibrated amount over the initial value and the level of downstream NOx has risen a calibrated amount over the level of upstream NOx.

11. A method for diagnosing a stuck-in-range fault condition of a downstream NOx sensor in a vehicle during first and second low exhaust flow conditions, wherein the vehicle includes an exhaust system having a controller with memory, a selective reduction catalyst (SCR) device, the downstream NOx sensor which is configured to measure a downstream NOx level on an outlet side of the SCR device, and an upstream NOx sensor which is configured to measure an upstream NOx level on an inlet side of the SCR device, the method comprising:
 detecting a fuel shutoff event to thereby determine the presence of a low exhaust flow condition;
 detecting an active regenerative event of a particulate filter;
 measuring the upstream and downstream NOx levels using the respective upstream and downstream NOx sensors;
 recording in a first memory location, by the controller, the upstream and downstream NOx levels from the respective upstream and downstream NOx sensors during the low exhaust flow condition when the regenerative event is active;
 recording in a second memory location, by the controller, the upstream and downstream NOx levels from the respective upstream and downstream NOx sensors during the low exhaust flow condition when the regenerative event is not active;
 comparing, by the controller, each of the recorded upstream and downstream NOx levels in the first and the second memory locations to a zero or near-zero threshold;
 executing a first control action when the upstream NOx level is below the threshold and the downstream NOx level exceeds the threshold, including indicating, via the controller, a stuck-in-range fault condition for the downstream NOx sensor; and
 executing a second control action when neither of the upstream or downstream NOx levels exceeds the threshold, including recording a diagnostic code in the memory of the controller indicating that the downstream NOx sensor is properly functioning.

12. The method of claim 11, further comprising:
 starting one of a debouncing timer or counter when the downstream NOx level exceeds the threshold.

13. The method of claim 12, further comprising: allowing the debouncing timer or counter to count through a corresponding calibrated interval or error count; and
 executing the first control action only when the upstream NOx level is below the threshold and the downstream NOx level exceeds the threshold after the respective interval elapses or the error count is reached.

* * * * *